INVENTORS.
ROBERT O. BRADLEY
PAUL F. DE LAMATER
BY
Marshall, Wilson & Yeasting
attorneys

United States Patent Office 3,410,367
Patented Nov. 12, 1968

3,410,367
ELEVATOR MOTOR ACCELERATION CONTROL BY A STEPPED RESISTOR RESPONSIVE TO DISTANCE FROM FLOOR
Robert O. Bradley and Paul F. De Lamater, Toledo, Ohio, assignors, by mesne assignments, to The Reliance Electric and Engineering Company, Cleveland, Ohio, a corporation of Ohio
Filed Feb. 7, 1964, Ser. No. 343,301
5 Claims. (Cl. 187—29)

ABSTRACT OF THE DISCLOSURE

An elevator hoist motor control utilizing the means employed in the prior art to control the deceleration of the motor as a function of elevator spacing from a floor at which the elevator is to stop in bringing the elevator to its final stop as the means to control the acceleration of the hoist motor as a function of elevator spacing from a floor in starting the car away from the floor. Adjuncts include controls for integrating the control of the hoist motor by the car motion responsive devices other than the leveling controls for both acceleration and deceleration, and controls providing operation where malfunctions occur, or the elevator is stopped outside the range of the leveling control devices.

---

This invention relates to control systems for objects movable in a path and particularly to systems controlling the operations of an elevator as it advances along its path in a structure.

Elevator systems, particularly those designed for carrying passengers, are required to provide rapid transportation from station to station without causing discomfort of the passengers. This involves controls for the driving mechanism which are free of the bumps or jerks incidental to abrupt changes in the motion of the elevator cab. In addition to the high inertia imposed by the substantial mass of the elevator cab, car, cables and counterweight and the related equipment in the moving system of the elevator, there are wide variations in the loading imposed upon the cab which create substantial difficulties in the designing and adjusting of a system affording uniformly comfortable riding characteristics. Thus an elevator cab is ordinarily counterweighted by a weight equal to the weight of the cab and its associated equipment together with 40% of the capacity load of the cab. Accordingly, under unloaded or lightly loaded conditions, the weight of the counterweight exceeds that of the cab and the elevator must be retarded when it is ascending and driven when it is descending. At balanced conditions wherein the loading of the cab is 40% capacity, torque must be supplied to overcome only the inertia forces of the system and those forces imposed by friction, windage and the like, whether the car be driven upward or downward. Under heavy load conditions the car must be driven upward and retarded in its descent. Between these limits there is a continuous range of variations of the power requirements imposed upon the lifting equipment for the elevator.

It has long been considered optimum operation of elevators to establish a running pattern which does not vary with load wherein the elevator is brought up to speed when starting from a floor as rapidly as possible either to the maximum to be attained before deceleration for a stop is to be initiated or to the maximum rating speed of the elevator where the length of the run is sufficient to enable full speed to be attained. Similarly the stopping pattern should also be achieved in a minimum amount of time consistent with the safety and comfort of the passengers. The consistency of the elevator running patterns for a given car at all levels of loading is desirable not only from the standpoint of the efficient operation of the system but also from the standpoint of obtaining precision in the initiation of the stopping sequence and the final stopping position of the car, ordinarily level with the floor at the landing to be served.

Heretofore many forms of controls have been evolved wherein the acceleration of the elevator as it moves away from a stop has been based upon a pattern having a time basis. Thus in some instances a sequence of time delay switches are operated following a starting signal to increase the lifting motor energization in a step-by-step fashion at what are intended to be predetermined time intervals. Equivalent operation has been achieved by means of motor-driven devices rotating shafts upon which a series of cams are arranged to operate a succession of switches in accordance with a time based pattern, those switches establishing the energization levels for the lifting motor. In many instances the time based pattern has been differentially related to the motion of the elevator car as determined by the rotation of the sheave over which the lifting cables are trained as by means of a differential receiving inputs from the lifting cable sheave and an auxiliary motor drive, frequently termed an advance motor, to provide an output, as the rotation of an actuating device for a series of mechanical switches, controlling the energization of the elevator lifting motor. In each of the aforenoted types of controls, the time generated pattern has been subject to a substantial number of undesirable characteristics. Timers of the type which have been employed inherently have some range of variation of the intervals they define. They are subject to losing their adjustment either through changes in the electrical, magnetic or mechanical parameters of the system. Furthermore, under many conditions of loading, no absolute tieing of the location of the elevator car to its rate of acceleration or deceleration can be achieved and thus variations in the operating characteristics result.

A primary object of this invention is to generate a control pattern for a moving system such as an elevator which is based upon the position of the elevator, particularly as this control pattern relates to the acceleration of the equipment from a stopped position.

Another object is to improve the speed and rate of acceleration of elevators.

A third object is to control the acceleration of elevators by means of highly reliable and conventional equipment.

A fourth object is to enable an elevator ordinarily controlled by a car position speed generated pattern to be safely and effectively operated in the event of an extraordinary interruption of the car's travel.

A fifth object is to prevent irregularities in the acceleration pattern for an elevator car when a car subject to a pattern which is a function of displacement from a landing from which it is to travel in a given direction is initially displaced in the opposite direction and must be driven toward the landing in the given direction.

In accordance with the above objects, one feature of this invention resides in utilizing inductor switches responsive to the proximity of an elevator car to a landing as the actuating means for developing a sequence of starting signals to control the acceleration of the elevator car as it travels away from a landing in accordance with a predetermined pattern and independently of variations in the nature of the loading imposed upon the car.

In one embodiment of the invention employed for illustrative purposes herein, switches of the inductor type are arranged such that a series of switches suitably oriented on the elevator car structure are brought into the range of inductive influence of ferro-magnetic vanes mounted in the hatchway along which the car travels at positions precisely located with respect to the stopping stations for the elevator car. These switches function to alter the pattern of energization of the elevator motor as the car is moved away from the landing as by altering the resistance in series with the shunt field of a generator having its armature connected in a series loop with the armature of the elevator lifting motor, whereby that motor is subjected to a variable D-C voltage according to the speed it is desired to develop therein, while the motor field is energized at a constant level.

As an adjunct to this type of elevator car starting control, certain additional features are incorporated in the system to enable the elevator car to be started when it is stopped as in the case of emergency operation at positions other than those adjacent a normal stopping station whereby the elevator can be started and can be run to the next adjacent stopping station from which it can then be started in the normal means contemplated by this invention. In the illustrative embodiment, a car stopped at a position outside the range of control of the conventional leveling switches is caused to run to a landing when safe conditions prevail at the speed ordinarily used when the car is being inspected. For example, in an elevator operating at 800 feet per minute, this speed may be of the order of 100 feet per minute.

In another embodiment illustrated herein the entire pattern of acceleration and deceleration of the elevator car is a function of the displacement of the car from the landing from which it departs and the landing which is its destination. In this system inductor switches are effective to increase the speed pattern for the hoist motor in steps as the car is moved from the landing from which it departs so that its magnitude is a function of the displacement of the car from that landing. These switches are also effective to decrease the speed pattern in steps as the car is moved toward the landing at which it is to stop so that its magnitude is an inverse function of the displacement of the car from that landing. During the acceleration of the car while it is out of the operating range of the inductor switches and until it reaches full speed or a stopping signal interrupts acceleration, its speed pattern is generated by a cam shaft actuating switches in accordance with the amount of rotation of the shaft. The rotation of this shaft effectively represents the displacement of the car from its starting point since it is driven through a differential having each of its inputs driven from the hoist motor shaft but at different speeds. Thus the amount of operation of the hoist motor controls acceleration. Deceleration is initiated at a distance from the landing at which the car is to stop which is a function of the speed of the car. It is controlled by the rotation of the cam shaft to operate switches in the reverse order from that for acceleration and progressively decrease the pattern signal controlling the hoist motor and thus the car speed as it approaches the range of operation of inductor switches adjacent the stop. During the interval the car runs at full speed the shaft remains stationary and no changes in the pattern signal are generated by the switches it controls.

In each of the illustrative embodiments the car position based starting pattern is applied to a separate resistance string, sections of which are cut out in steps until a value common with the maximum value of a separate deceleration or leveling resistance string is attained. Further reduction in resistance for acceleration and increases in resistance for deceleration from higher speeds is achieved on a single string of resistances. This splitting of the controlling resistances affords a convenient and accurate means of adjusting the system since interactions between acceleration and leveling patterns are avoided when one is adjusted.

The above and additional objects and features of this invention will be more fully appreciated from the following detailed description when read with reference to the accompanying drawings in which.

Figure 4:
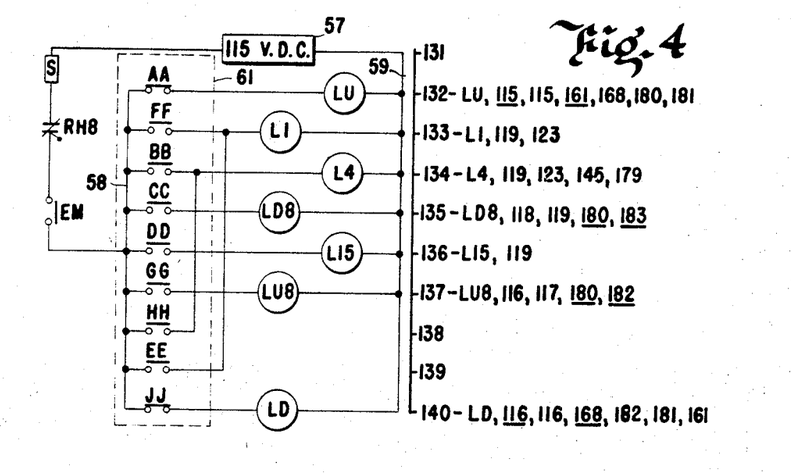
FIG. 4 is an across-the-line schematic diagram of a set of inductor switches and the relays responsive thereto, suitable for utilization with the systems of FIGS. 1 and 2.

The circuits shown in the drawings have been presented in across-the-line form and have been provided with a marginal index to facilitate an appreciation of their operation. These circuits have been zoned horizontally and each zone numbered in the right hand margin so that actuating coils of relays, relay contacts and other equipment can be located. In across-the-line diagrams the relay contacts are not shown physically related to their actuating coils. The index sets forth this relationship by providing in the margin adjacent each coil symbol its identifying characters and to the right of those characters listing the location of any contacts shown elsewhere in the drawings by the line or zone number where they appear. This index also indicates the nature of the contacts. Back contacts, those normally closed when the armature of the relay is released are indexed with underlined line numbers to distinguish them from front contacts, those normally open when the relay armature is released. Thus, back contact DF at 132 is indexed at line 137 adjacent the symbol for the down generator field relay DF as "132" while front contact DF at line 136 indexed as "136" at line 137. Contacts are shown in all drawings but FIG. 4 in the position they assume when their actuating armature is released. In FIG. 4 the inductor switches contact AA to JJ are shown for a car level with the landing so that the inductive relationship of the indexing hatchway vane opens normally closed contacts FF to EE while contacts AA and JJ are out of the range of influence.

Figure 6:
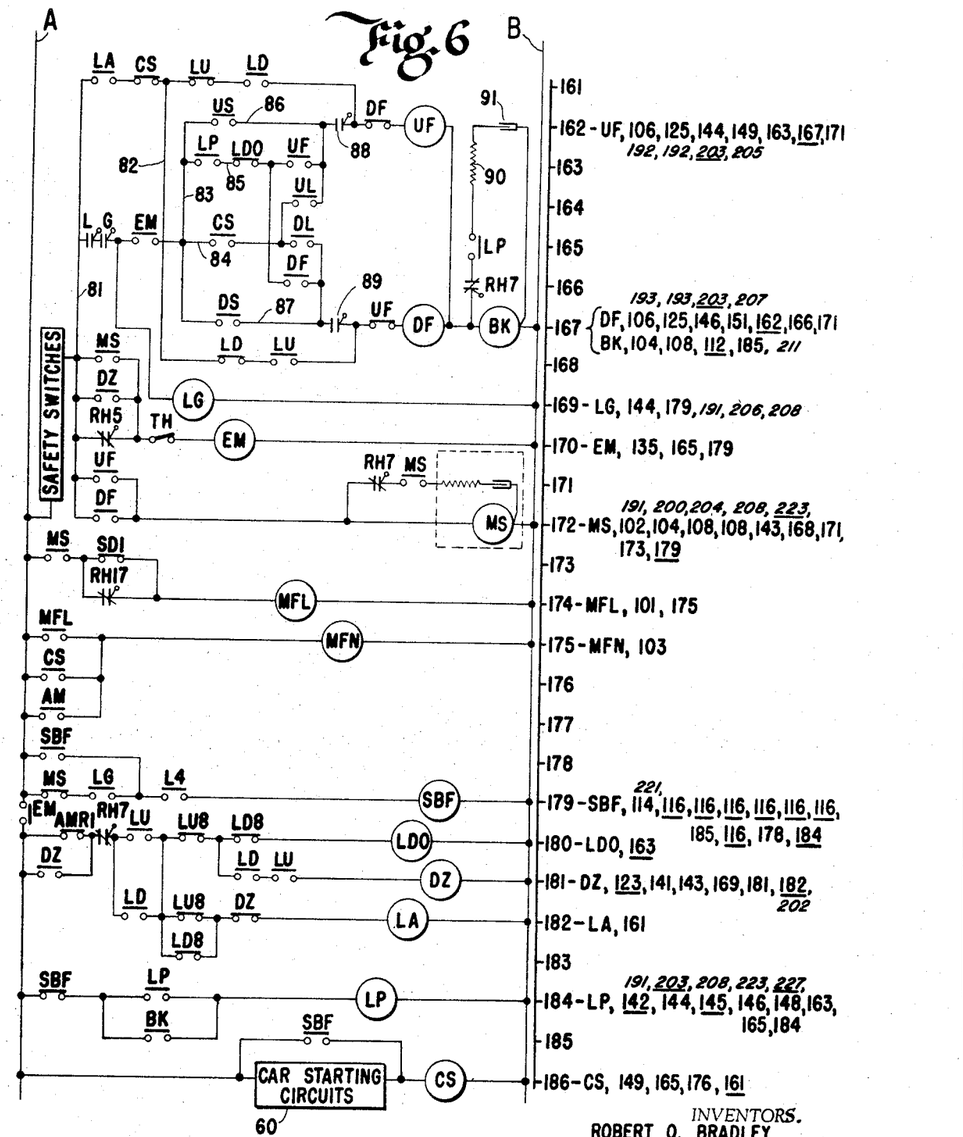
FIG. 6 is a schematic diagram in across-the-line form showing additional controls for the equipment depicted in FIG. 3 suitable for the systems of either FIG. 1 or FIG. 2.

While most of the contacts indexed in the margins of the drawings are vertical, a few in FIG. 6 have been inclined to distinguish them. The circuit of FIG. 6 is applicable to both of the systems illustrated herein. Those indexed contact line numbers are applicable only to the system of FIG. 2 where the speed pattern is car position generated for the entire acceleration and deceleration intervals. The inclined numbers index the extra contacts of the relays of FIG. 6 required in FIGS. 7 and 8 for this type of system.

As a further aid in understanding the invention and its application, the relays employed are listed below in the alphabetical order of their symbols together with a name generally indicating their function and the line in which they appear in the drawings. The index numbers for the system of FIG. 2 have been enclosed by parenthesis.

| | | |
|---|---|---|
| AD | Advance down control | (193). |
| AM | Auxiliary main switch | 147. |
| AMR | Advance motion | 148 (209). |
| AMR1 | ----do---- | 149 (210). |
| AMS | Advance motion stopping | (208). |
| AU | Advance up control | (192). |
| BK | Brake | 167. |
| CS | Car start | 186. |
| DF | Down generator field | 167. |
| DL | Down direction control | (Not shown.) |
| DS | Down inspection | Do. |
| DZ | Dead zone | 181. |
| EM | Emergency | 170. |
| HC | Highest call | (Not shown.) |
| IN | Inspection | (221). |
| LA | Leveling auxiliary | 182. |
| LD | Down leveling | 140. |
| LDO | Leveling door open | 180. |
| LG | Landing and gate | 169. |
| LP | Protective | 184. |
| LU | Up leveling | 132. |
| L1, L4, LU8, LD8, L15 | Leveling | 133-137. |
| MFL | Motor full field | 174. |
| MFN | Motor normal field | 175. |
| MS | Main switch | 172. |
| OWS | Overtime wait service | (Not shown.) |
| RDC | Rheostat direction control | (206). |
| S | Landing signal stopping | (Not shown.) |
| SBF | Stop between floors | 179. |
| SC | Car signal stopping | (Not shown.) |
| SD1-SD4 | Slowdown | Do. |
| UF | Up generator field | 162. |
| UL | Up direction control | (Not shown.) |
| US | Up inspection | Do. |
| VL | Floor selector travel limit | Do. |
| VS | Stop assured | 151 (195). |
| VS1 | Auxiliary stop assured | (211). |

The invention has been illustrated in two forms of elevator control each of which utilizes a variable voltage or Ward-Leonard type system wherein a prime mover such as an induction motor (not shown) rotates the armature of a direct current generator G connected in series with the armature of a direct current lifting motor M. The primary control of the speed of the lifting motor is achieved by varying the voltage applied across its armature through control of the shunt field GF1 and GF2 of the generator. Some secondary speed control is afforded by weakening the field MF of the lifting motor. In order to enhance the control of the generator shunt field it is supplied from a direct current source (not shown) through a series rheostat 11 and is connected in a bridge 12 having a regulator generator armature R connected across its diagonals. The speed pattern voltage applied across the input diagonals of the bridge by adjustment of the rheostat resistance is subject to corrective bias from the regulator generator through the composite effect within the field structure of the regulator of a pattern field RP1 and RP2 subject to the same currents from the rheostat 11 as the main generator shunt field GF1 and GF2, a speed signal as a counter-electromotive force field RD energized across the lifting motor armature M and developing a field in the regulator differentially related to the pattern field, a compounding signal as a current field RI serially connected in the armature loop of the lifting motor and main generator as across the main generator interpole windings IP to produce flux cumulative with the pattern field, and a damping or rate field RDI producing flux differentially related to the pattern field in accordance with rate of change of speed indicated by the change in back E.M.F. across the motor armature. The rate field and its relationships to the other regulator fields is set forth in greater detail in R. O. Bradley patent application Ser. No. 343,329, entitled "Elevator Controls" and filed herewith.

In each of the systems illustrated the pattern signal for the shunt field is developed by a cam actuated series of switches which short out portions of the rheostat resistance when they are closed. These rheostat switches are represented in the circuit diagrams with an arm extending from the right side of the contacts and have reference characters comprising a number and the prefix RH. The switches have been schematically represented in FIGS. 1 and 2 as arrayed for successive operation by cams 11, 12, 13, 14 and 15 on shaft 16 which is rotated by sprocket 17 coupled by chain 18 to differential output sprocket 19.

Figure 1:
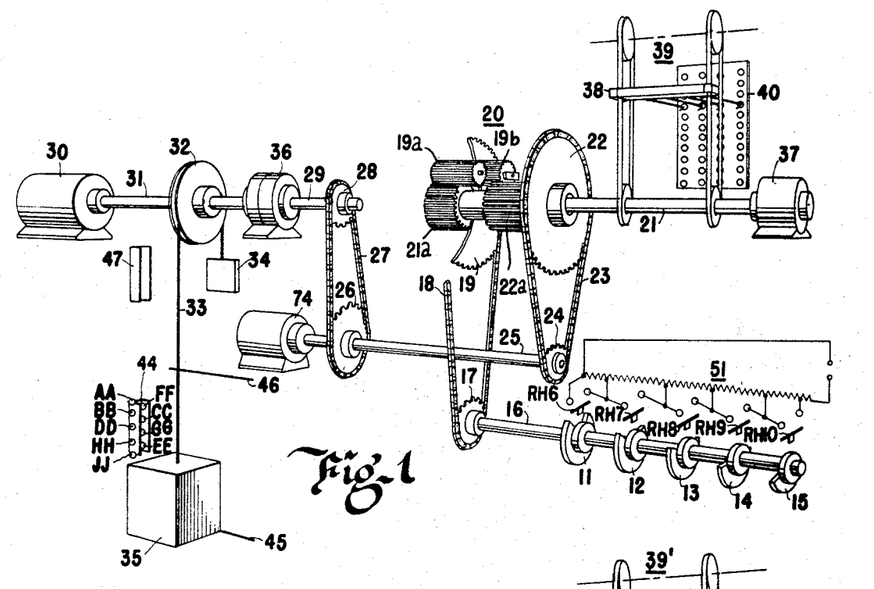
FIG. 1 shows a schematic diagram of an elevator control system wherein car motion adjacent landings is controlled by car position with certain portions broken away for clarity of illustration.
Figure 2:
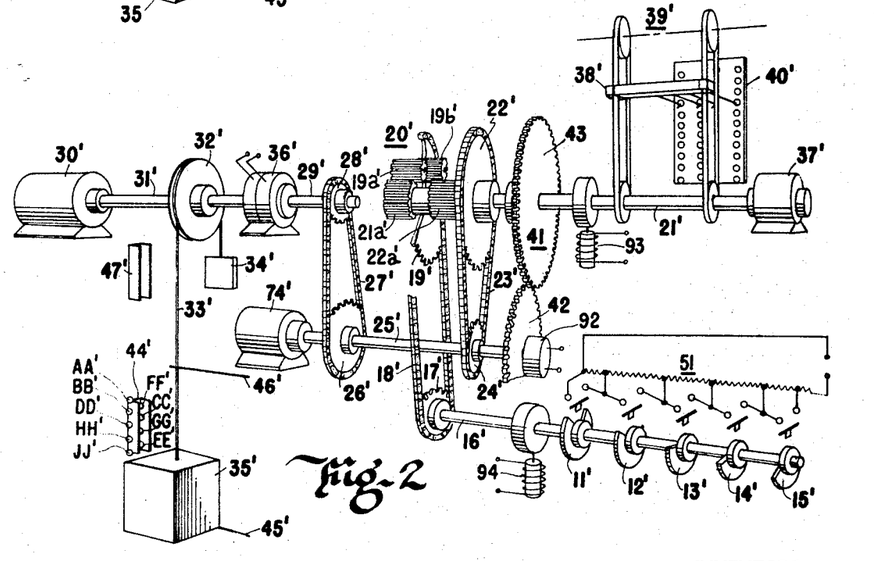
FIG. 2 shows a diagram as FIG. 1 for a control system wherein the entire acceleration and deceleration of the car is controlled by the position of the car.

Sprocket 19 is the output of differential 20 driven from crosshead drive shaft 21 and by means of sprocket 22, chain 23, sprocket 24, shaft 25, sprocket 26, chain 27, and sprocket 28, on shaft 29, from the elevator lifting motor 30.

Cam shaft 16 rotates from a neutral position in which the rheostat switches are open to insert full resistance in series with the generator field in one direction for less than 180° to develop a speed pattern for an ascending car and less than 180° in the opposite direction for the descending speed pattern. Shaft 25 driven from the hoist motor 30 rotates in one direction for an ascending car and the opposite direction for a descending car as does crosshead shaft 21. Differential 20 is composed of one input from sprocket 22 freely rotatable on shaft 21 and keyed to gear 22a meshing with planetary gear 19b journaled on differential sprocket 19. The other input is from shaft 21 keyed to gear 21a meshing with planetary gear 19a also journaled on sprocket 19. Planetary gears 19a and 19b mesh with each other but are free of the opposite member's driving gears. Thus even with a single direction of rotation of the differential input the output to shaft 16 can rotate in either direction depending upon the relationship of input rotations. The two systems illustrated each include a lifting motor 30 for rotating a shaft 31 having a sheave 32 over which elevator lifting cables 33 are trained. A counterweight 34 is supported on one end of the cables and the other end is secured to the sling within which the cab 35 of the elevator is carried. The motor shaft 31 is coupled through a clutch 36 to sprocket shaft 29 which for the moment can be considered directly connected to the motor shaft.

The systems illustrated differ in the mode of driving the second input to the differential. In the system of FIG. 1 that input is driven by an advance motor 37 which drives the crosshead 38 of the floor selector machine 39 utilized to commutate circuits as an array of contacts 40 in a two coordinate system. This system includes a general vertical alignment of contacts for circuits having like functions at different car positions and a generally horizontal alignment of contacts to be engaged by brushes on the crosshead when a car is at any given position so that the contacts are commutated in accordance with the position of the elevator. Since much of the equipment in FIG. 2 corresponds to that in FIG. 1, that corresponding equipment of FIG. 2 is assigned the same reference characters as FIG. 1 and those characters are primed to distinguish them from FIG. 1. In the system of FIG. 2 the crosshead 38' and the second input shaft 21' to the differential 20' are driven by the motion of the elevator 35' through an advance gear train 41 from gear 42 on shaft 25' to gear 43 on shaft 21' during portions of the acceleration of the elevator and through the differential 20' when the rheostat shaft 16' has been rotated to its limits.

The present invention is particularly concerned with the control of the initial development of the pattern signal as the elevator starts away from a stopping station whereby car position is positively related to the pattern signal and to the generation of a speed signal related to car position throughout all speed changes. This positive relationship is achieved by means of inductor switches AA, BB, CC, DD, EE, FF, GG, HH and JJ mounted upon the elevator car 35 so they move with the car as it travels along the hatchway in the structure it is to serve. Ferromagnetic vanes 44 are mounted in the hatchway so that they are within the range of influence of switches FF, BB, CC, DD, GG, HH and EE and outside of the range of influence of switches AA and JJ when the car is exactly level with the stopping station. Each inductor switch is arranged to be closed magnetically when out of the range of influence of the vanes 44 and to be opened as the vane enters the region where it interrupts the magnetic flux. Ideally the switches respond to the presence of the vane at a given position in the relative travel of the switch and vane and without any distinction between the position from which further advance causes the closure of contacts and that from which further retraction causes opening of the contacts. While this ideal has not been achieved commercially, for purposes of explanation it can be assumed that the movement of either end of the vane past a given position on the switch when introducing the vane into the region of magnetic influence will cause the contacts of the switch to engage and when withdrawing the vane from the region of magnetic influence will cause the switch contacts to separate. In one embodiment a pair of vanes of equal length, about thirty inches long, and located in horizontal alignment are positioned in the hatchway so that they are one quarter of an inch out of the range of influence of switches AA and JJ spaced thirty and one-half inches apart on the car and beyond the opposite ends of the vanes when the car is level with the floor. The orientation of the remaining switches as shown in FIGS. 1, 2 and 4 is such that a car when about thirty inches below its stopping station and moving upward opens contact AA to drop relay LU at line 132 if the leveling relay circuits are enabled for a stop. At about twenty-nine inches below the stop contact FF will open with no effect since contact EE remains closed until the car is one inch below the stop at which time relay L1 will drop out. Similarly, contact BB will open at twenty-six inches below the stop but relay L4 will be held in by parallel contact HH until the car advances to four inches below the stop. Contact CC opens when the car is twenty-two inches below the stop to drop relay LD8. At fifteen inches below the stop contact DD opens to drop relay L15. Advance of the car to within eight inches of the stop opens contact GG to drop relay LU8. Since the car stops without overshooting the stop, contact JJ is not opened and since it is at the stop contact AA reopens so that relays LU and LD are energized and relays L1, L4, LD8, L15 and LU8 are deenergized. This operating sequence would be reversed if the car were descending to the stop. In FIGS. 1 and 2 the car is shown stopped level with a landing 45 so that the vanes 44 are oriented with the inductor switches as described for a level car. One additional landing 46 and the vanes 47 for that landing are illustrated to show generally the spatial relationship. The condition of the switches in FIG. 4 is that assumed when the car is level with the landing so that switches AA and JJ are out of the range of influence of the vanes and are closed while all others are open.

In starting away from the stop in an upward direction, the switches would be carried past the vanes so that one-quarter inch above the stop contact JJ would open, one inch above the stop contact FF would close and relay L1 be enabled, four inches above the stop contact BB would close and relay L4 would be enabled, then successively at eight, fifteen, twenty-two, twenty-six, twenty-nine and thirty inches above the stop switches CC, DD, GG, HH, EE and JJ would close. A start downward from the stop would reverse the sequence so that contact AA would open at one-quarter inch below the stop, contact EE would close at one inch below to enable relay L1, contact HH would close at four inches below the enable relay L4 and so on.

In each of the exemplary systems of FIGS. 1 and 2 operation of the inductor switches has been utilized to initiate the generation of a starting pattern for the main generator shunt field GF1 and GF2 so that the car is accelerated away from its stopping stations according to a position generated pattern. Once the car has moved beyond the region of control of the effective inductor switches, additional changes in the pattern voltage to the generator shunt field are produced by a combination of advance motor 37 operation driving the floor selector crosshead 38, a time-based function, and the rotation of the lifting motor 30, representing car motion from the stop, as derived from the differential 20 in the system of FIG. 1. In the system of FIG. 2, the entire pattern signal is generated by car position since the transfer from the inductor switches is to a differential output having both inputs driven by the rotation of the lifting motor shaft. One input is continuously coupled to the differential 20' while the other is coupled only during acceleration as by means of a clutch coupled gear 42. One embodiment of the floor selector-rheostat control from the lifting motor and an advance motor similar to FIG. 1 is shown in J. H. Borden Patent 2,685,348 of Aug. 3, 1954 for "Elevator Control System." A form of control employing a clutch actuated gearing is shown in J. H. Borden Patent 3,051,267 of Aug. 28, 1962 for "Elevator Control." While many forms of inductor switches are available, a typical switch suitable for the present system is shown in J. H. Borden Patent 2,598,214 of May 27, 1952 entitled "Inductor Leveling Switch."

FIGURE 3

Figure 3:
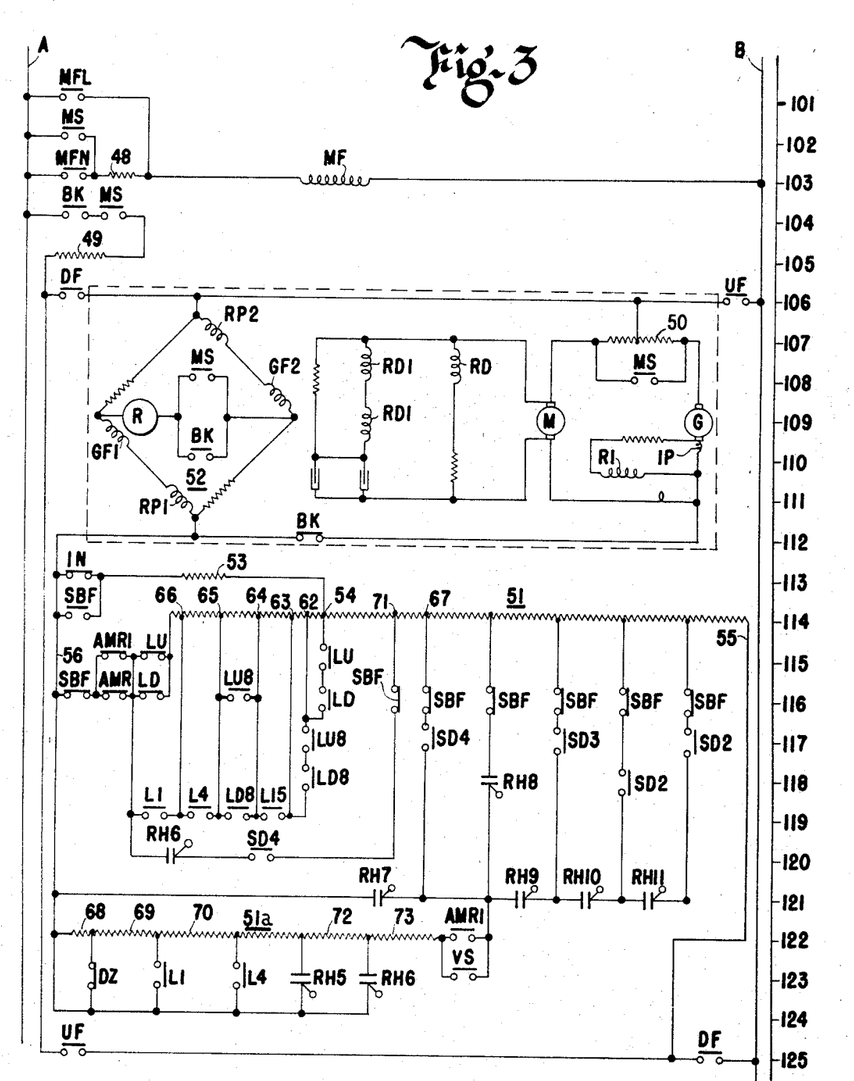
FIG. 3 is a schematic diagram in across-the-line form of a variable voltage D-C current lifting motor of an elevator, together with the generator supplying that motor and the control equipment for that generator suitable for either the system of FIG. 1 or FIG. 2.

The lifting motor, the generator supplying its armature and the pattern developing means for determining the output of the generator are shown in FIG. 3. A direct current source (not shown) of suitable voltage, e.g., 240 volts, is connected across leads A and B to supply the equipment shown. Motor field MF at 103 is initially energized through main switch contact MS at 102 and limiting resistance 48 and, after a suitable interval to permit the field to build up, it is energized through motor full field relay contact MFL at 101. As the motor approaches full speed, field weakening is applied through motor normal field contact MFN at 103.

Generator shunt field, split in the opposite arms of bridge 49 as GF1 and GF2 receives current from leads A and B through brake relay contact BK and main switch contact MS at 104, resistance 49 and the polarity reversing arrangement of down generator field relay contacts DF or up generator field relay contacts UF at 106 and 125. Control of the current in the shunt field or the pattern signal to that field is afforded primarily by the series resistance of rheostat 51 as trimmed by regulator R connected across diagonals of bridge 52.

Motor armature M is energized from generator armature G when the elevator is to run by operation of main switch contacts MS at 108 in the motor generator armature loop bypassing resistance 50 and in the bridge 52 connecting regulator armature R across its diagonals. When the car is running, the brake relay is energized to connect the regulator armature by closing contact BK at 110 and to open the suicide circuit by opening back contact BK at 112.

In regular operation the elevator is started from a normal stopping station, a landing such as 45 or 46, and the inductor switches are within the range of influence of the hatchway vanes as 44 or 47. Under these circumstances, the start pattern signal is established by the operation of the inductor switches and their corresponding relays to progressively reduce the amount of resistance in the start section 51a of rheostat 51. However, the elevator can be stopped outside of the region in which the controlling inductor switches are actuated so that the rheostat 51a control is not available to develop a start pattern. When the car is to be started without the normal sequence of inductor switch operations, it is run at a low speed, conveniently that employed on inspection operation, by operation of stop between floors relay SBF to close its contact at 114 and connect resistance 53 and that portion of rheostat 51 between junction 54 and lead 55 in series with bridge 52. This establishes a pattern for an elevator speed of about 100 feet per minute which is maintained until the elevator reaches a region in which the inductor switches assume control to slow and stop the elevator.

The stop between floors relay, while operated, renders the acceleration rheostat and the rheostat contacts ineffective by opening contacts SBF in the several lead at line 116. On inspection operation the pattern is similarly controlled by the closing of contact IN at 113 and the deenergization (by means not shown) of slowdown relays SD2, SD3 and SD4 to open their contacts at 117, 118 and 120. These slowdown relays are normally energized when the car is set to run or running.

As the elevator approaches a landing at which it is to stop, the crosshead 38 of the floor selector machine is stopped and since the car motion continues, the differential 20 reverses its output to drive cam shaft 16 back toward its neutral position in which all rheostat contacts are open. The opening of these contacts, as RH11, RH10, RH9, RH8, RH7 and RH6 in succession, progressively increases the amount of resistance in series with bridge 52 and thereby reduces the generator field and the motor speed. The rheostat contact operations are so correlated to car position and speed that shortly after contact RH6 at 120 opens, the car carries its first inductor switch into the range of influence of the hatchway mounted vane for the landing at which the car is to stop at a speed which can thereafter be controlled by the inductor switches by the introduction of the rheostat resistance between junction 54 and lead 56. As will be seen in FIG. 4 the source 57 is connected across leads 58 and 59 by the closing of rheostat switch RH8 at 183 since contact EM at 185 of the emergency relay is closed while the car runs. This energizes all of relays LU, L1, L4, LD8, L15, LU8 and LD since all of the inductor switch contacts within the dashed rectangle 61 are closed by magnetic action at this time. Subsequent to this, the inductor switches are carried into the range of influence of the hatchway vanes to open their contacts. A car approaching a landing from below operates its inductor switch contacts to deenergize in succession relays LU, LD8, L15, LU8, L4 and L1 after which LU is reenergized. A car descending to a landing deenergizes its relays in the order LD, LU8, L15, LD8, L4 and L1 and then reenergizes LD.

At the time an ascending car deenergizes LU, it is about 30 inches from the landing with the assumed vane and inductor switch orientations and is traveling according to the pattern signal established by the resistance between junction 54 and lead 55 through closed leveling relay contacts LU at 115, LD at 116, LU8 at 117, LD8 at 118, L15, LD8, L4 and L1 at 120, closed advance motor relay contacts AMR at 115 and 116 and closed stop between floors relay contact SBF at 116. When relay LU is deenergized to open contact LU at 115 and close back contact LU at 115, the rheostat resistance between junctions 54 and 62 is added to reduce pattern voltage. Next, when the car is twenty-two inches from the landing, relay LD8 drops to open contact LD8 at 118 and add the rheostat section between junctions 62 and 63. At fifteen inches from the landing L15 drops to open contact L15 at 119 and add the resistance between junctions 63 and 64. At eight inches from the landing LU8 drops to open contact LU8 at 116 and since contact LD8 at 119 was opened earlier the resistance between junctions 64 and 65 is added. The drop of relay L4 when the car is four inches from the landing adds the resistance between 65 and 66 and the final step of adding the remaining resistance of the rheostat occurs when L1 drops at one inch from the landing. Further advance of the car reenergizes relay LU to open the rheostat circuit at back contacts LU and LD while the car stands at the landing.

The starting or accelerating rheostat section 51a is controlled by the inductor switches which controlled the final slowdown. Those switches control energization of the leveling relays of FIG. 4 when the car is set to run and emergency relay EM is energized and until the rheostat cam shaft 16 has been rotated sufficiently to open normally closed rheostat relay contact RH8 at which time the rheostat contact string is in full control of the resistance of rehostat 51. At the time a start signal is issued advance motor relay contact AMR1 at 122 closes to introduce the resistance of rheostat 51a in series with that of rheostat 51 between junction 67 and lead 55. The inductor switches cause sections of rheostat 51a to be short circuited. Thus the initial slow movement of the car under minimum pattern signal (maximum rheostat resistance) causes the drop of dead zone relay DZ to short rheostat section 68 and increase the pattern. Further movement of the car to one inch from level energizes relay L1 through the removal of the vane opening inductor contact EE or FF to short rheostat section 69. When the car is four inches from level, the pattern is again increased by shorting rheostat section by closing contact L4 at 123 due to the removal of the vane from the control region for contact BB or HH. Contact L4 at 147 also closes at this time to start the advance motor 37 and thereby combine a positive input on shaft 21 with that on shaft 25 so that cam shaft 16 is rotated in a positive direction to actuate rehostat contacts in numerical succession. Thereafter the pattern is controlled by the cam actuated contacts RH5, and RH6 at 123. Once the seventh cam actuated contact RH7 at 121 is closed the acceleration pattern of rheostat 51a is no longer effective and further pattern development is derived from those sections of rheostat 51 common to both the acceleration and leveling sequences by operation of contacts RH8, RH9, RH10 and RH11 in that order.

Short runs can be encountered wherein the retardation pattern would be picked up before cam operated contact RH7 closed. This might occur if the crosshead 38 were advanced to a stopping contact before RH7 closed and in setting up the stop sequence contact AMR1 at 122 were opened by the deenergization of relay AMR1. An abrupt transition in the pattern signal producing a bump in the car motion would result from the transfer of pattern from the unshorted portion of acceleration rheostat 51a and the resistance in rehostat 51 between junction 67 and lead 55 to the resistance of rehostat 51 between lead 55 and junction 71 or 54, depending upon whether contact RH6 at 120 had closed or not. Thus assume that the stop signal was picked up after closure of contact RH5 at 123 but before closure of contacts RH6 at 123 and 120. The pattern would be determined by sections 72 and 73 and the resistance from 67 to lead 55 prior to the stop signal and by the resistance from 54 to lead 55 thereafter (assuming all inductor switches were beyond the vane of the preceding floor). This abrupt transition of pattern is avoided for short runs by stop assured relay contact VS at 123 which holds the accelerating rhesotat 51a in the pattern developing circuit until the seventh cam operated switch RH7 at 121 has been closed. After the closure of RH7 it can be reopened in the normal slowdown sequence by the cam operations and the inductor switches. As the deceleration resistance string between junction 67 and lead 56 is introduced by rotation of rheostat cam shaft 16 toward neutral, it opens contact RH5 at 151 to drop relay VS and open contact VS at 123 so that the separate deceleration resistance string determines the final leveling pattern.

FIGURE 4

The inductor switches of FIG. 4 as noted above are supplied from a suitable direct current source 57 of, for example 115 volts, through a normally closed cam actuated switch RH8 and contacts EM at 135 of the emergency relay at 170. Thus when the car is set to run at speeds below that at which cam actuated contact RH8 at 133 is closed in the speed pattern control by rheostat cam shaft 16 the inductor switch circuits are energized for the initial portion of the acceleration pattern or the final portion of the deceleration pattern.

FIGURE 5

Figure 5:
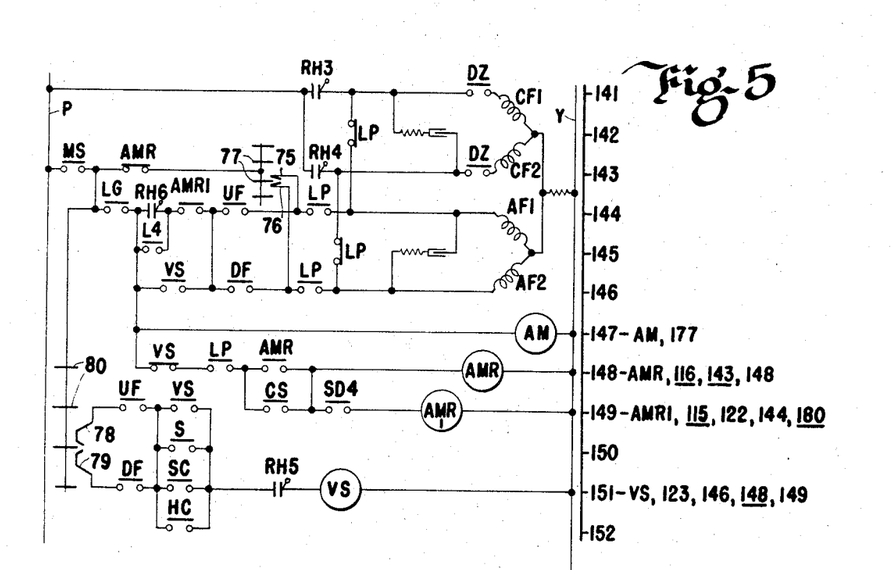
FIG. 5 is a schematic diagram in across-the-line form illustrating portions of an elevator lifting motor control system according to FIG. 1 to which this invention may be applied.

The advance and correcting motor controls for the system of FIG. 1 are set forth in FIG. 5. These controls are energized from a suitable source of alternating current (not shown) connected across the leads P and Y. The split phase field CF1 and CF2 of the correcting motor 74 is effective to center the shaft 16 driving cams, exemplified by 11 through 15, only while the elevator is within the dead zone adjacent a landing, i.e., within a half inch of the landing. When the car is positioned in this manner by the control of the inductor switches and the crosshead 38 has been accurately centered on the floor selector contact array 40, the correcting motor drives the shaft 16 to center while the clutch 36 permits slippage of shaft 31 with respect to shaft 29. The correcting motor is enabled when the car is in the dead zone by closure of dead zone relay contacts DZ at 141 and 143. Any misalignment of shaft 16 from a centered position is sensed by cam actuated contacts RH3 for counterclockwise misalignment and RH4 for clockwise misalignment. If proper rotational orientation of shaft 16 to its neutral position is achieved when the car is stopped, contacts RH3 and RH4 are open and the correcting motor has no effect.

Advance motor 37 of FIG. 1 has split phase field AF1 and AF2 and is arranged to be driven in one direction when the car ascends and in the opposite direction when it descends by means of up generator field relay contact UF at 144 and down generator field relay contact DF at 146 respectively. This energizing circuit is completed between leads P and Y through main switch relay contact MS at 143 when the car is conditioned to run and landing and gate relay contact LG at 144 or advance motion relay back contact AMR at 143.

Advance motor 37 is arranged to drive the crosshead 38 at a single speed corresponding on scaled down range of travel of the crosshead from the range of travel of the elevator to the full speed of the elevator. This scale full speed is achieved with virtually instantaneous acceleration to and deceleration from that speed.

In starting the elevator the inductor switches generate a speed pattern signal which, as noted above, continues to develop by means of the rotation of cam shaft 16 through the combined drive of the lifting motor 30 and advance motor 37. In order to correlate the inductor switch pattern control properly with the cam actuated switch pattern control and yet maintain the proper speed relationships of the crosshead motion to car motion, it is advantageous to delay the initiation of advance motor operation until the elevator has moved through a substantial portion of its range of travel in which the inductor switches control the pattern. In the example shown the lift motor speed, the advance motor speed and the patter developed through inductor switch operation are correlated so that transfer from inductor switch control to cam actuated switch control is initiated when the elevator has traveled four inches from the landing and has closed switch BB or HH to energize leveling relay L4 at 134. Relay L4 in addition to introducing a step of acceleration in the pattern by contact L4 at 123 closes a contact L4 at 145 to complete the energizing circuit for the advance motor from lead P through contacts MS, LG, L4, AMR1, UF or DF, and LP to windings AF1 and AF2 and lead Y.

The advance motor immediately drives the crosshead at scale rated elevator speed and rotates shaft 16 from the slightly negative position to which it had been carried by the differential action occurring when lift motor 30 drove positively and advance motor 37 remained stationary through the neutral position and toward a positive position. In the sense employed here, negative position means a reversal of rotation of shaft 16 from the direction it should be rotated to develop the desired pattern signal, the positive position being counterclockwise from neutral for one direction of elevator travel and clockwise from neutral for the other direction of travel.

The differential drive of advance motor 37 and lift motor 30 successively actuates cam switches in the sequence RH3 at 141 or RH4 at 143 (depending upon the direction of travel and thus the direction of rotation of shaft 16) without effect since contacts DZ at 141 and 143 are open at this time; then RH5 at 123, 151, and 170; then RH6 at 120, 123, and 144; then RH7 at 121, 166, 171, and 180; then RH8 at 118, 133; and so on through the pattern developing operations of RH9, RH10, RH11 at 121; until full speed is approached at RH17 at 174 is opened to weaken the lifting motor field. In this sequence of cam switch operations, the closure of contact RH6 at 144 provides a holding circuit for fields AF1 and AF2 prior to the deenergization of all of the inductor switches and thus the opening of contact L4 at 145 upon the opening of back contact RH8 at 133. Contact VS at 146 functions to maintain the advance motor energized after a stop signal has caused the opening of AMR1 at 144 and until the precise centering of the crosshead is achieved by operation of centering brushes 75 and 76 and floor contacts 77 and 143 and 144 through the closed contact AMR at 143.

Auxiliary main switch coil AM at 147 is energized whenever the main switch contact MS at 143 is closed and the landing and gate relay contact LG at 144 is closed. This switch maintains motor normal field relay MFN energized at 175 through contact AM at 177 when the motor full field relay has been deenergized to open its contact MFL for full speed operation.

Advance motion relays AMR and AMR1 at 148 and 149 enable the starting operation. They are responsive to a start signal from car start relay CS through closure of contact CS at 149. Ordinarily protective relay LP and slowdown relay SD4 are energized to close contacts LP and SD4 whereby an energizing circuit for AMR and AMR1 is available through contacts MS, LG, VS, LP, CS and SD4 when a car start signal is applied in the conventional manner.

Stop assured relay VS defines the range of travel in which the elevator is capable of responding to a stop signal. It responds to three conventional forms of stop signals, each of which is actuated by means not shown here, through closure of a landing signal stopping relay contact S at 150, a car signal stopping relay contact SC at 151, or a highest call contact HC at 152. Energization of relay VS can occur only when the elevator has closed cam actuated contact RH5 at 151 as where the rheostat cam shaft 16 has been rotated by the advance motor operation. Relay VS is energized from the crosshead 38 as it carries brushes 78 and 79 along array 40 including a vertical lane of contacts 80 when a stopping contact S, SC or HC is closed and RH5 is closed. Brushes 78 and 79 are enabled according to the direction of car travel so that an ascending car has only upper brush 78 above the crosshead 38 enabled through up generator field relay contact UF at 149 and a descending car has only lower brush 79 below the crosshead 38 enabled through down generator field relay contact DF at 151. The degree of advance of brushes 78 and 79 from the crosshead and their effective length determine the maximum and minimum distances in advance of the crosshead and with the crosshead advance the distance in advance of the actual elevator car position the stop signal for a landing must be registered.

In operation a running elevator carries its crosshead along array 40 until a stop signal is encountered to energize relay VS. Relay VS opens its contact VS at 148 to deenergize advance motion relays AMR and AMR1 to enable the leveling sections of rheostat 51 by closing contacts at 115 and 116, to disable the normal energizing path for the advance motor by opening contact AMR1 at 144 and to enable the precise centering circuits for the crosshead by closing contact AMR at 143. Inasmuch as the crosshead 38 is not close enough to its centered position at the landing for which the stop is to be made at this time to engage brushes 75 or 76 which it carries with that contact 77 in the vertical lane of contacts of array 40 for the landing at which the stop is to be made, an alternate circuit is provided to maintain an energizing path for fields AF1 and AF2 through contact VS at 146. The advance motor therefore continues to drive the crosshead 38 toward a position centered at the landing station on the floor selector array 40. Before the stop pick up brush 78 or 79 is carried off its contact 80 by the crosshead motion and before the pattern has been so reduced that cam actuated switch RH5 has opened to drop stop assured relay VS, brush 75 or 76 engages contact 77 thereby providing an alternate circuit through contact AMR at 143. The crosshead is then driven to center contact 77 for the landing for which the call is registered between precisely located brushes 75 and 76 and hold the crosshead in that position whereby a reference is established for differential 20 so that as the car continues to approach the landing the shaft 16 controlling cam operated contacts begins to rotate toward its neutral position operating the contacts in reverse order to slow the elevator.

When cam operated switch RH8 is released, it closes a circuit to the leveling relays of FIG. 4 through contact RH8 at 133 to lead 58. Further travel of the elevator toward the landing while the crosshead is held at the landing station on the contact array 40 opens contact RH7 at 121, the last contact common to the acceleration and deceleration pattern controls. Then contact RH6 at 120 is open as the last cam actuated decelerating contact. At this time the elevator is close to the position in which inductor switch AA for an ascending car or JJ for a descending car is carried into the range of influence of the hatchway vane 47 adjacent the landing for which a stop is to be made. Thereafter the pattern is controlled by the sequencing of the inductor switches and the relays of FIG. 4 as described above to reduce the car speed and ultimately stop it.

In normal operation the protective relay LP at 184 of FIG. 6 is energized through contact EM at 179 and contact BK at 185. However when the elevator is stopped between floors and a normal starting operation under a generator field pattern signal controlled by the inductor switches is unavailable because the inductor switches are out of the range of control by the hatchway vanes, the protective relay is deenergized and the advance motor is driven from cam controlled switches RH3 and RH4 at 141 and 143. Thus in the case of an emergency stop protective relay LP drops and closes back contacts LP at 142 and 145 to energize the advance motor field through cam actuated contacts RH3 or RH4 while opening the normal energizing paths at contacts LP at 144 and 146. This energization is in a direction tending to drive the crosshead back from its advanced position toward a location corresponding on the array 40 to the car position in the hatchway. This drive is necessary since the normal operation of the floor selector crosshead is in advance of actual car position and it must be brought into synchronism with the car in order to restart the car. Since the normal acceleration pattern is not available where the car is outside its leveling zone, it is run to the next landing at a low speed without control of the rheostat contacts actuated by rotation of cam shaft 16 and with the floor selector crosshead in a position on the contact array essentially in synchronism with the position of the elevator in the hatchway. Since the advance motor is only intermittently actuated from cam contacts RH3 or RH4 the floor selector is advanced along its contact array by brief periods of energization as the car motion tends to rotate the cam shaft 16. Actuation of the motor to advance the floor selector crosshead drives the cam shaft toward neutral since the advance motor drive speed is scaled to full car speed and rapidly outdistances the car to return the cam shaft 16 toward neutral. This opens contact RH3 or RH4 to deenergize the advance motor whereupon continued car motion again becomes effective to rotate shaft 16 and operate the contact. Such intermittent energization cycles of the advance motor can occur at a rate of several times a second until the elevator advances to within four inches of the next landing and causes the energization of relay L4. Relay L4 then deenergizes relay SBF opening its contact at 114 to enable the rheostat leveling sections to be effective in bringing the elevator to a position level with that landing. Once the car brake is set at the landing the protective relay LP is reenergized and the advance motor is returned to control of centering brushes 75 and 76 on the floor selector crosshead through closure of contacts LP at 144 and 146 and the opening of back contacts LP at 142 and 145. The correcting motor is enabled at this time to insure the return of cam shaft 16 to its neutral position since the elevator is in its dead zone and relay DZ is energized to close contacts DZ at 141 and 143.

FIGURE 6

Leads A and B of FIG. 6 are connected across the source of direct current supplying FIG. 3. The circuits of this figure include the generator field relays UF and DF, the brake relay BK; those relays insuring safe operating conditions including landing-gate relay LG, emergency relay EM and main switch MS, the motor field relays MFL and MFN; stop between floors relay SBF; leveling relays LD0, DZ and LA; protective relay LP and car start relay CS.

A conventional group of safety switches are connected in series with the generator field relays and the safety relays to include such switches as the emergency stop switches, the overtravel switches, governor switches and the like (not shown). Up generator field relay connects the generator shunt field with a polarity to drive the elevator upward while down generator field relay reverses that polarity. The generator field relays are provided with starting, running, leveling and inspection circuits. In order to enable any of those circuits all safety switches must be closed between lead A and lead 81. The car leveling circuit extends from lead 81 through leveling auxiliary relay contact LA and car start relay back contact CS at line 161 to energize lead 82. Under normal stopping conditions neither generator field relay is energized through this path since the elevator stops level with the landing from the direction of its approach. However, if the elevator overshoots the landing or after it has stopped it shifts its position sufficiently, this circuit becomes effective. As noted with respect to FIG. 4, an elevator stopped level with the landing energizes both up and down leveling relays LD and LU, a slight displacement upward opens contact JJ to deenergize relay LD at 140 and similar downward displacement opens contact AA to deenergize relay LU at 132. If the car is level and both relays LD and LU are energized, their back contacts at 168 and 161 respectively are open. If a nonlevel condition exists, one of the relays is deenergized while the other is energized to complete a circuit to the appropriate generator field relay to effect a leveling correction. Thus a car which has sagged will level upward by dropping relay LU at 132 to close back contact LU at 161 while energized relay LD holds contact LD at 161 closed. Since neither generator field relay is energized at this time, back contact DF at 162 is closed and a circuit is completed to up generator field relay UF and brake relay BK whereby the motor is energized to lift the car and the brake is released until it is raised into alignment with the landing and relay LU is energized to open its back contact LU at 161 and deenergize relays UF and BK. A car above the leveling zone will cause energization of down generator field relay DF and brake relay BK from lead 82 through contacts LD and LU at 168 and UF at 167 to relevel the car.

A prerequisite to running the elevator under any conditions other than leveling is the closure of all landing doors and the car gate as indicated by closed landing switch L and gate switch G at 165 to energize landing-gate relay LG at 169 from lead 181. Switches L and G in conjunction with emergency contact EM at 165 energize lead 83 to enable, so long as the car is not at its limits of travel and has not operated hatchway limit switches 88 or 89, the generator field relays through the car start circuit of lead 84, the car running circuit of lead 85 and the inspection circuits of leads 86 and 87. When the car is run on inspection as by the conventional controls on the top of the cab (not shown) the up generator field relay is energized for up travel by energizing up inspection relay US to close contact US at 162. Down inspection runs are made by energizing down inspection relay DS (not shown) to close contact DS at 167 and energize down generator field relay DF. When car start relay CS is energized, it closes contact CS at 165 and depending upon which direction of travel is set by the up or down direction control relays UL or DL (not shown), a circuit is completed through contact UL at 164 or DL at 165 to up or down generator field relay UF or DF respectively. Once the car is started car start relay CS is dropped. However, a running circuit for UF or DF is established and maintained until the car is in the final leveling region through protective contact LP and leveling door open relay contact LDO at 163 and, for up travel contact UF at 163 through switch 88 and back contact DF at 162 to relay UF, or for down travel contact DF at 166 through switch 89 and back contact UF at 167 to relay DF.

The brake control by relay BK is retarded upon initial stopping but not upon releveling by the circuit across the relay including resistance 90 and capacitance 91. When the car is set to run at low speed, as indicated by closed back contact RH7 at 166 operated by a cam on shaft 16, and the car has been running as indicated by closed protective relay contact LP at 165, the shunt circuit is effective.

Emergency relay EM is also behind the safety switches to lead 81. It is energized to indicate a safe condition in the elevator system apart from landing doors and the gate and is energized when the car runs through main switch contact MS at 168, when the car is in the dead zone through contact DZ at 169 and when car speed pattern is below that of cam actuated contact RH5 by closed RH5 contact at 170. In the event the elevator stalls in the leveling zone (sensed by means not shown) the thermal relay contact TH at 170 is opened to drop relay EM. Main switch MS at 172 is energized by either generator field relay through the closing of contacts UF or DF at 171 or 172.

Motor full field relay MFL is arranged to provide full current to motor field MF of FIG. 3 through contact MFL at 101 when the main switch is energized to close its contact MS at 173. As with the previously discussed slowdown relays, slowdown relay SD1 (not shown) is normally energized when the car is running and not within the region adjacent its limits of travel to open back contact SD1 at 173. Thus when the speed pattern has been fully developed by rotation of cam shaft 16 to close the switches prefixed by RH and providing shunts for sections of rheostat 51, the shaft actuates normally closed cam actuated contact RH17 at 174 to open the circuit to MFL and weaken the motor field by the insertion of resistance 48 whereby the motor is brought up to speed. Relay MFL provides an energizing path for motor normal field relay MFN at 175 through contact MFL at 175. Relay MFN is also energized by closing car start relay contact CS at 176 even before MFL is energized in starting the car and by auxiliary main switch contact AM at 177 while the car is running. Contact MFN at 103 connects the motor field across leads A and B.

When a car is stopped between floors and particularly more than four inches from a landing, the restarting cannot be accomplished under the control of the position generated pattern derived from the operation of the inductor switches since they cannot be operated in the proper sequence. Accordingly, the system is arranged to advance the car at a slow speed such as normal inspection speed to the next landing from which a normal start employing inductor switch control can be undertaken. This modification of the operation of the motor controls is set up by stop between floors relay SBF at 179. Relay SBF is deenergized under normal operation. When the car has been stopped under emergency conditions emergency relay EM is dropped by the opening of one of the safety switches to deenergize lead 81. Contact EM at 179 opens to deenergize relays LDO, DZ, LA and LP. Contacts LP at 142, 144, 145 and 146 transfer to arrange the advance motor controls for bringing the floor selector crosshead into synchronism with the car position and cam shaft 16 to its neutral position. Cam operated contact RH8 at 133 is closed as shaft 16 approaches its neutral position. When the emergency or condition causing the stop between floors has been cleared, emergency relay EM is reenergized from lead 81 through closed cam operated switch RH5. In this condition the main switch has been deenergized so that back contact MS at 179 is closed; since the car is not in a position to open a landing door or its gate relay LG remains energized so that contact LG at 179 is closed; and if the car is not within four inches of a landing to place inductor switch BB or HH within the range of influence of a hatchway vane 44 or 47, leveling relay L4 will be energized through closed contacts RH8 at 133 and EM at 135 to close contact L4 at 179 and energize relay SBF.

Relay SBF seals itself in by contact SBF at 178 and drops protective relay LP at 184 until the elevator is moved to within four inches of a landing at which it will stop, at which time contact L4 at 179 will open to drop relay SBF and the normal leveling sequences under control of the inductor switches will bring the car into the landing and stop it. Contact SBF at 114 will be closed as long as relay SBF is energized to place resistance 53 in series with the rheostat section between junction 54 and lead 55 thereby establishing a single speed pattern to advance the elevator toward the landing. The seven back contacts SBF at line 116 open while SBF is energized to prevent any alteration in the effective resistance of the rheostat supplying the pattern signal to the generator field.

At the time the safe running conditions were restored and emergency relay contact EM at 179 closed, the normal car starting circuits 92 were all open. However, contact SBF at 185 bypasses those circuits to energize car start relay CS whereby contact CS at 149 is closed with no effect since protective relay contact LP at 148 remains open, contact CS at 165 is closed to energize through the closed direction control relay contact UL or DL at 164 or 165 the up or down generator field relay UF or DF and the brake relay BK, and contact CS at 176 is closed to initiate energization of the motor field MF through operation of motor normal field relay MFN at 175.

When the car runs at inspection speed to a position sufficiently close to the landing adjacent the location in which the car was stopped, it drops relay L4 to open contact L4 at 179 and drop relay SBF. The normal final stopping sequence then follows wherein leveling relays LU and LD maintain an energizing path for the generator field relay and the brake relay BK at line 161 or 167 and those leveling relays together with relay L1 produce the final pattern for stopping the elevator level with the landing through the pattern control circuit restored by the closing of back contact SBF at 116 to lead 56.

Leveling door open relay LDO at 180 institutes the door opening operation during the final leveling of the elevator into the landing (by means not shown) and transfers control of the generator field relays UF and DF from the running circuit of lead 85 by opening back contact LDO at 163. The energization of relays UF and DF during the final leveling is then controlled through control of relays LU and LD without regard to landing door and gate operations which open switches L and G. Relay LDO is energized only when the advance motion relay AMR1 is deenergized to close back contact AMR1 at 180 and cam operated back contact RH7 at 180 is closed indicating that the elevator is conditioned to stop and has a low speed pattern in effect. Further the elevator must be within eight inches of its landing for LDO to be energized through back contacts LU8 and LD8 at 180 and through contact LU at 180 or LD at 182.

Once the elevator is in the dead zone level with the landing contacts AA and JJ are closed at 132 and 140 and dead zone relay DZ at 181 is energized through contacts LU and LD at 180, 181 and 182. Back contact DZ at 123 opens to prepare the first step in the acceleration pattern causing the car to move from the floor to its next stop. Contacts DZ at 141 and 143 close to enable the correcting motor so that it will correct any deviation of cam shaft 16 from its neutral position. Contact DZ at 169 insures that the emergency relay EM is energized when the elevator is stopped at a landing even if the cam shaft 16 has achieved such a degree of misalignment as to maintain contact RH5 at 170 open. Relay EM must be energized to close contact EM at 179 in order that protective relay LP hold its contacts at 142, 144, 145 and 146 in proper condition for the correcting motor to function.

Contact DZ at 181 provides a holding circuit for relay DZ after the advance motion relay AMR1 has been energized and until the car has moved sufficiently to deenergize one of the leveling relays LU or LD. This is particularly advantageous in the operation of relay DZ from the standpoint of the pattern signal developed since even if the elevator initially sags sufficiently to deenergize LU as the brake is released upon the initiation of starting relay DZ will not be reenergized for an ascending car as it is raised through the dead zone. This avoids an irregularity in the pattern signal since if relay DZ were reenergized the pattern would upon the first drop of DZ due to sag reach its first step, as it was brought through the dead zone it would return to its initiating level and as it again left the dead zone it would return to its first level and continue to increase from that point. Such irregularities in pattern would result in changes in speed of the elevator which would be perceptible and therefore undesirable.

Leveling auxiliary relay LA at 182 is dropped as the elevator enters the dead zone by the opening of back contact DZ at 182. This disables the generator field relays UF and DF to be controlled by leveling relays LU and LD for the final stop by opening contact LA at 161. Relay LA is energized as the elevator is moved to within eight inches of the landing by the closure of one of back contacts LU8 or LD8 at 182 and 183. Protective relay LP at 184 is energized once the brake relay and the emergency relay have been energized to close contact BK at 185 and EM at 179. It is dropped by stop between floors relay SBF by opening back contact SBF at 184 to, as described above, enable the advance motor to drive the crosshead of the floor selector and cam shaft 16 to the proper condition for the location of the stopped elevator car through contacts LP at 142, 144, 145 and 146; disable the advance motion relays AMR and AMR1 by contact LP at 148; open the generator field relay circuits at contact LP at 163; eliminate the usual timed drop of brake relay BK by opening contact LP at 165; and open its seal circuit at line 184.

Car start relay CS at 186 normally functions in each starting operation of the car through the usual actuating circuits (not shown) represented in rectangle 92 to respond to calls, dispatch signals and the like. Upon the energization of relay CS, contact CS at 149 energizes the advance motion relays AMR and AMR1, contact CS at 161 disables the releveling circuits, contact CS at 165 energizes the generator field and brake relays UF or DF and BK and contact CS at 176 energized motor normal field relay MFN. When a stop is made between floors and the safe running conditions have been reestablished to energize relay SBF the car start relay is energized by contact SBF at 185 to initiate the car motion.

The preceding description, particularly that concerned with FIGS. 5 and 6 has set forth the circuits employed for car position signal pattern control of the start of an elevator of the type shown in FIG. 1 wherein an advance motor drives the floor selector crosshead in advance of the position on the floor selector contact array corresponding to actual car position along the hatchway. In this type of system the pattern signal generated for the generator shunt field is a function of both car position and time except in the initial portions of the pattern.

A control suitable for complete car position pattern signal generation is shown in FIG. 2 wherein car position as sensed from the relationship of inductor switches on the car to elements mounted in the elevator hatchway control the pattern while the car is close to a landing on both a stopping and starting operation and wherein car position as sensed from the rotation of the lifting motor shaft controls the pattern while the car is out of the range of control of the inductor switches and either accelerating or decelerating. The system of FIG. 2 differs from that of FIG. 1 in utilizing an advancing gear train 41 to move the crosshead 38' of the floor selector 39' to a position on contact array 40' corresponding to a position of the elevator in the hatchway in advance of the actual elevator position. In order to achieve this advance, the gear train 41 is selectively engaged during the start of the elevator and is disengaged when an adequate degree of advance has been achieved or a call has been encountered. Disengagement of the gear train is accomplished by means of an electromagnetic clutch 92. Advance motor 37' is employed in this system only to bring the rheostat cam shaft 16 back to its neutral position when a malfunction has occurred. In stopping the crosshead on the array 40' at a position corresponding to the landing at which the elevator is to be stopped an electromagnetically applied brake 93 on shaft 21' is employed in place of the advance motor 37 of FIG. 1 since the advance motor armature ordinarily coasts on shaft 21'. When the advance motor or the correcting motor carries the shaft 16' to its neutral position, the electromagnetic drive clutch 36' is released while the car is in its dead zone. However, the advance motor functions with the hoist motor input to the differential on inspection operation, and when a car is being advanced to the next landing following a stop between the floors, an emergency stop, or a rheostat cam shaft reversed (to be explained below).

In view of the supplemental elements in FIG. 2 over those of FIG. 1 the control circuits for those elements are somewhat different from those for FIG. 1. Thus the system of FIG. 2 is provided with a variable voltage control circuit of the type shown in FIG. 3 for FIG. 1. Its inductor switches can be actuated in the same manner as set forth in and described for FIG. 4. However, the advance and correcting motor field circuits are quite different from those of FIG. 5 as set forth in FIG. 8 since the advance motor is not energized except when the elevator is stationary or when it is running at low speed as for inspection operation, correction of a reverse operation of rheostat cam shaft 16', or a stop between floors. While many of the functions of the advance motion and stop assured relays are similar in the system of FIG. 2 to those described with respect to the system of FIGS. 1 through 6 there are distinctions in their functions and there are supplemental functions performed by additional relays such as advance motion starting relay AMS. Accordingly, their energizing circuits have been shown in FIG. 7. All of the circuits of FIG. 6 are employed in a system of FIG. 2 in the same form as they were employed in the system of FIG. 1.

Figure 7:
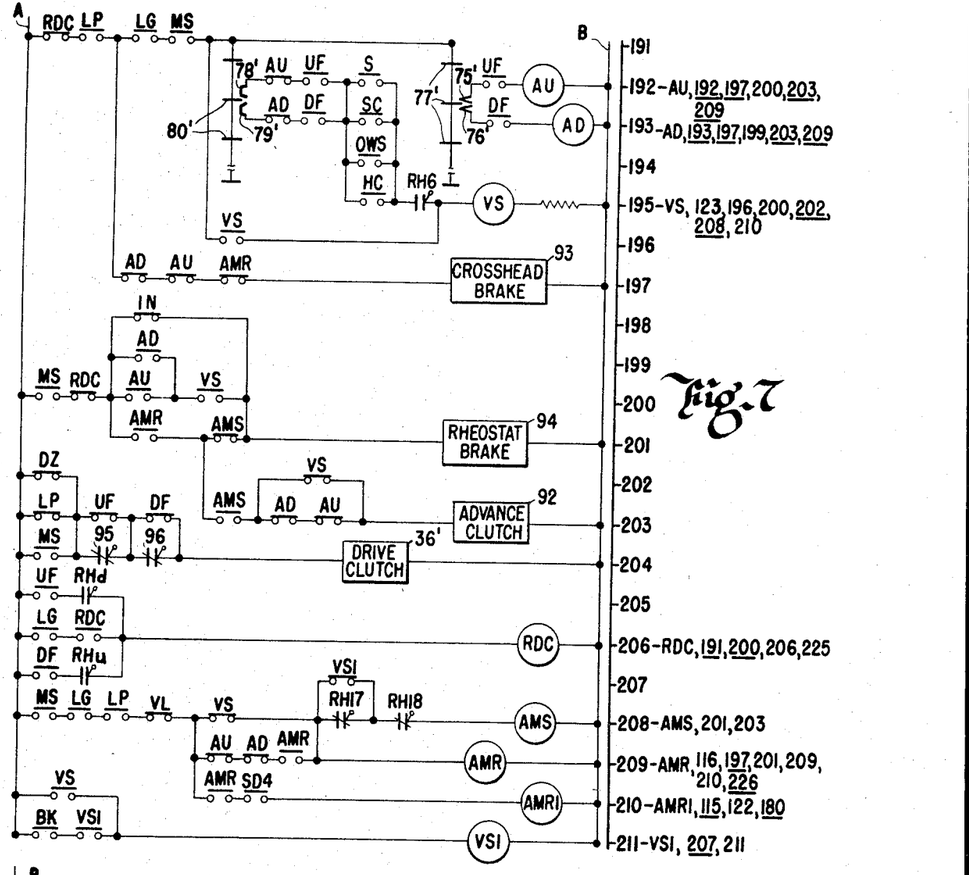
FIG. 7 is an across-the-line schematic diagram of certain of the controls for the system of FIG. 2 including certain controls corresponding to controls of FIG. 5.
Figure 8:
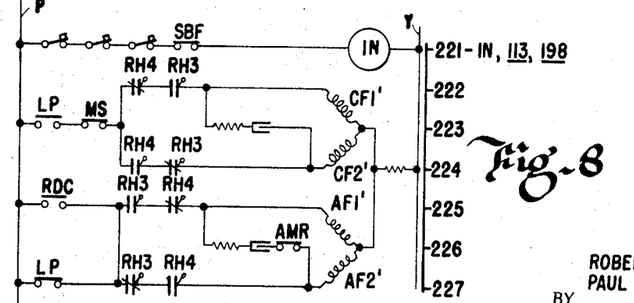
FIG. 8 is a diagram of certain controls and elements for the system of FIG. 2 which differ in some respects from the controls of FIG. 5.

Thus a system in which car position determines the pattern signal controlling the energization of the generator shunt field and therefore the voltage applied to the armature of the lifting motor would include the physical arrangement of FIG. 2, the motor and generator circuits of FIG. 3, the inductor switch circuits of FIG. 4, and the controls of FIG. 6. Such a system has correcting motor and advance motor field circuits as shown in FIG. 8, and stopping controls as shown in FIG. 7 in place of those shown in FIG. 5 supplemented by the additional controls shown in FIG. 7.

In order that a slow down or stopping signal is sensed sufficiently in advance of the arrival of the elevator at the position in its hatchway at which it is to be stopped, the floor selector crosshead 38′ should be advanced on its floor contact array 40′ a suitable slowdown distance in advance of the actual elevator position for the speed of the elevator to enable it to be slowed to the stop at acceptable rates. Car motion generates a starting pattern from the operation of inductor switches as the car initiates its movement from a landing in the same manner as described for the system of FIG. 1. Car motion is applied to shaft 25′ through clutch 36′ coupling the lifting motor armature shaft 31′ to shaft 29′. This coupling is effected by energization of drive clutch 36′ as shown at 204 of FIG. 7.

As in the system of FIG. 1 in the system of FIG. 2, the speed of crosshead 38′ is in proportion to the speed of the elevator only after the elevator has completed its acceleration up to full speed. It differs from the system of FIG. 1 in that at full speed the crosshead is driven by elevator motion rather than the advance motor and during the acceleration period the speed of the crosshead is proportioned at all times to the speed of the elevator. Advantageously it is proportioned to three times the equivalent speed of the car. When the crosshead reaches the position on contact array 40′ corresponding to the landing at which a stop is to be made, it stops abruptly and precisely, thus establishing slow down distance for the elevator as the distance that the crosshead runs ahead of the relative position of the elevator. Since the crosshead advance is also driven by car motion the stopping signal pickup distance during car acceleration is a function of the speed of the car.

The system of FIG. 2 drives rheostat cam shaft 16′, on which the cams are mounted to cut resistance out of the generator field circuit until full speed is reached, by means of differential 20′ driven by sprocket 22′ from crosshead drive chain 23′ and advance gear train 41. Thus the differential corresponds to that of FIG. 1 in that advance gear 43 is keyed to crosshead drive shaft 21′ to provide an input from gear 21a′ keyed to shaft 21′ to differential output sprocket 19′ through gear 19a′ meshing therewith and journaled on sprocket 19′. Sprocket 19′ is freely rotatable on shaft 21′. The second differential input is from gear 22a′ keyed to sprocket 22′ and meshing with gear 19b′ which is journaled on differential sprocket 19′ and meshes with gear 19a′.

During acceleration, advance gear train 41 of FIG. 2 provides the advance function of advance motor 37 of FIG. 1. Once acceleration is completed, advance clutch 92 is released permitting shaft 25′ to rotate freely with respect to advance gear 42 journaled thereon and disengaging the advance gear train 41 as one input of differential 20′. The other input to the differential, through drive chain 23′ from the hoist motor shaft 31′ through electromagnetic clutch 36′ is engaged whenever the elevator is running. Hence during the period the elevator runs at rated speed and the rheostat cam shaft 16′ has been rotated to the position establishing the rated speed pattern for the generator field, that shaft is held stationary by rheostat brake 94 and the differential therefor transfers motion from its input connected to the hoist motor shaft 31′ to its input from the crosshead drive shaft 21′. Elevator motion thus drives the crosshead at a proportional speed.

Once the crosshead encounters a landing position at which the elevator is to be stopped, the rheostat brake 94 is released and a crosshead brake 93 is set so that the drive of the differential by car motion is transferred from crosshead drive shaft 21′ to rheostat cam shaft 16′ to crank it toward its neutral position. As the rheostat cam shaft approaches its neutral position, it cuts resistance into the generator field circuit as described above to slow the hoist motor and the elevator.

FIGURE 7

The hoist motor 30′ is coupled to the differential 20′ through energization of drive clutch 36′ whenever the car is running by means of main switch contact MS at 204 provided the floor selector crosshead limits switch 95 at the top of travel and switch 96 at the bottom, have not been reached. If the crosshead is carried to a limit the circuit is opened until the direction the elevtaor is set to travel is reversed since an up car has up generator field relay back contact UF at 203 open and would open parallel switch 95 at 204 at the upper limit while a descending car would have back contact DF at 203 and at its lower limit would open parallel switch 96 at 204. Protective relay back contact LP at 203 is open except when the elevator has been stopped by an emergency operation or has been stopped between floors. An energizing circuit is provided for the drive clutch when the car is outside of a dead zone by back contact DZ at 202 and when the car is within a dead zone at a landing at which it is stopped the drive clutch is deenergized since ech of parallel contacts DZ, LP and MS at 202, 203 and 204 are open. This enables the correcting motor to function in bringing rheostat cam shaft 16′ to neutral.

An accelerating pattern for the generator field and the advance of the crosshead 38′ along the contact array 40′ at three times the relative car speed to establish proper slowdown distances is achieved by energizing advance clutch 92 at 203. This is accomplished through energization of advance motion starting relay AMS at 208 to close contact AMS at 203 when the main switch contact at 200 is closed and advance motion relay contact AMR at 201 is closed. When the car has reached full speed no further resistance is to be cut out of the generator field circuit by rotation of rheostat cam shaft 16′. At this time the advance clutch 92 is disengaged and the rheostat brake 94 is energized and set through the dropping of relay AMS to open contact AMS at line 203 and close back contact AMS at 201.

The deceleration pattern for the generator field is initiated when the crosshead 38′ is stopped on the contact array 40′ and the input to the differential is restricted to that from shaft 25′ to sprocket 22′. Further motion of the car unwinds rheostat cam shaft 16′ under these conditions in a manner to open speed pattern switches as the car advances progressively diminishing distances toward the final stop so chosen that they operate at intervals of about ¼ second to slow the car at a rate of 4 ft./sec.² The winding of the shaft 16′ occurs as a different function of car displacement from that for unwinding the shaft. The winding of the shaft 16′ on acceleration is dependent upon the output of differential 20′ while sprocket 22′ is driven at a rotation speed to drive the crosshead 38′ at equivalent car speed when shaft 16′ is stationary and shaft 21′ is driven at three times equivalent car speed. On deceleration the unwinding of shaft 16′ is dependent only upon the output of differential 20′ while sprocket 22′ is rotated at a speed which would drive crosshead 16′ at equivalent car speed and the crosshead is stationary. Thus with the 3:1 advance ratio of the specific example, on acceleration the car travels one half the distance to advance the speed pattern a given step by rotation of shaft 16′ that it travels to retard the speed pattern that given step.

Advance motion starting relay AMS at 208 is energized when main switch contact MS, landing and gate relay contact LG, protective relay contact LP, floor selector travel limit relay contact VL, stop assured relay contact VS, and rheostat cam operated switches RH17 and RH18 are all closed at line 208. The floor selector travel limit relay VL (not shown) is energized only when the crosshead is at its limit of travel. When the rheostat cam shaft has rotated sufficiently to actuate all of the speed control cam actuated switches back contact of rheostat switch RH18 is open at 208 to release relay AMS. The advance clutch 92 is thereby released and the rheostat brake 94 engaged so that the full speed pattern is maintained and the crosshead is driven at a relative speed providing a one to one ratio with actual car speed until a stop signal is encountered.

Crosshead brake 93 at 197 is released from the start of the car until its slowdown. The brake is released when deenergized. A car conditioned to run has contacts RDC and LP at 191 closed. When it is to be started its advance motion relay AMR is energized to open back contact AMR at 197 and release the crosshead brake. At slowdown the crosshead is stopped by energizing and setting the crosshead brake.

A running car has landing and gate relay contact LG and main switch contact MS at 191 closed to energize stop enabling contacts 80′ and crosshead centering contacts 77′ on the floor selector contact array 40′ each connected in series with a contact at each landing position on the array. As the crosshead travels along the array it carries stop brushes 78′ and 79′ and centering brushes 75′ and 76′ over contacts 80′ and 77′ respectively. Brushes 78′ and 75′ are effective for an ascending car and 79′ and 76′ for a descending car. Brushes 78′ and 79′ are advanced on the crosshead so that they encounter contacts 80′ substantially in advance of the arrival of the crosshead at its centered position. Those brushes are of a length that requires substantial crosshead travel from their initial engagement with contact 80′ till the point they run off that contact. Brushes 75′ and 76′ are positioned closely adjacent each other and are of shorter length than brushes 78′ and 79′ so that only a short crosshead travel carries them from initial engagement to release of contacts 77′. The release position of brush 75′ from contact 77′ is slightly in excess of the width of that contact from brush 76′ so that centering of the crosshead at a landing position separates brushes 75′ and 76′ from the contact 77′ for that landing by only suitable operating clearances.

As the crosshead of a running car carries brushes 75′, 76′, 78′ and 79′ across their contacts other contacts (not shown) on the crosshead commutate stopping circuits to close landing signal stopping relay contact S at 192, car signal stopping relay contact SC at 193, overtime wait service relay contact OWS at 194 or highest call relay contact HC at 195 when suitable calls are in registration during the period the floor selector contacts for those relays are being commutated. Thus when the crosshead of an ascending car approaches a landing position at which a stop signal is registered for that car brush 78′ runs onto the landing contact 80′ and energizes stop assured relay VS at 195 from lead A, contacts RDC, LP, LG and MS at 191, contacts 80′, brush 78′ contacts AU and UF at 192 one or more of parallel contacts S, SC, OWS and HC, cam actuated switch RH6 at 195, coil VS and lead B. Further travel of the crosshead carries brush 75′ into engagement with contact 77′ for the landing to energize advance up control relay AU at 192 through contact UF, carries brush 78′ out of engagement with contact 80′ for the landing, and thereafter carries brush 75′ out of engagement with contact 77′ for the landing.

Energization of VS closes contacts at 123 as described above, at 196 to provide a seal circuit until the door and gate are opened to open contact LG, to prepare circuits at 200 and 202 for energizing the rheostat brake 94 and releasing the advance clutch 92, to prepare at 208 circuits releasing relays AMS, AMR, AMR1, and to energize at 210 auxiliary stop assured relay VS1 at 211. If the car has reached its rated speed and the rheostat brake 94 is set and the advance clutch 92 released when the stop sequence is initiated, the prime function is to set the crosshead brake. This occurs after relay AU is picked up to open back contact AU at 209 deenergizing relay AMR to close its back contact AMR at 197 when brush 75′ is carried off of contact 77′ to drop relay AU and permit back contact AU at 197 to close and complete the energizing circuit for crosshead brake 93. With the crosshead brake set, the rheostat cam shaft 16′ unwinds toward the neutral position to release the RH series of switches in inverse order and slow the car.

The energization of AU, or its counterpart AD for a descending car, opens the pick up circuit for stop assured relay VS at back contact AU at 192 and the energizing circuit for crosshead brake 93 at back contact AU at 197. The precise moment of setting of crosshead brake 93 is established by the drop of relay AU to close contact AU at 197. Contact AU at 200 is closed to energize the rheostat brake 94 in the event that brake is not set as where the car has not attained rated speed, while opening of back contact AU at 203 releases the advance clutch 92 under these circumstances. Opening of back contact AU at 209 completes the breaking of the energizing circuits for relays AMS and AMR.

The slowdown distance for the elevator is a function of its speed. Thus a car moving at one hundred feet a minute might need only a few inches or feet of travel to slowdown and stop while a car moving at eight hundred feet a minute would require three or more floors of travel to slow to a stop. As the car speed builds up the lead of the crosshead increases to provide the appropriate slowdown distance.

During acceleration and while relay AMS is energized the car can respond to stop signals. For example, upon starting from a landing the car may be required to stop at the next landing. The crosshead advance is such that the stop signal is picked up before the car has proceeded half the distance to the next landing and the acceleration pattern developed by the rotation of rheostat cam shaft 16′ is shifted to a deceleration pattern by reversing the rotation of the shaft. This shift occurs in two steps. First, the advance clutch is released so the crosshead speed is transferred from three times equivalent car speed to equivalent car speed while brushes 75′ or 76′ complete their transit of contact 77′ and during this interval the rheostat brake 94 is set, holding the then current pattern signal level so that car acceleration tends to stop and the car tends to run at a constant speed. Second, as the crosshead carries brush 75′ or 76′ from contact 77′ and relay AU or AD is deenergized the crosshead brake 93 is set, and the rheostat cam shaft is permitted to unwind to neutral generating a decelerating pattern. This two step procedure smooths the transition from acceleration to deceleration to avoid discomfort to the passengers.

On a short run, for example from one floor to the next, the traverse of brush 75′ or 76′ across contact 77′ requires a sufficient interval to enable a comfortable transition from acceleration to deceleration since the car speed and thus the crosshead is relatively low. On longer runs in which the car closely approaches rated speed the transit interval of the brush across contact 77′ is too brief to permit the comfortable transition and therefore the sequence is altered so that the advance clutch 92 is released to transfer crosshead speed from three times equivalent car speed to equivalent car speed and the rheostat brake 94 is set to establish a fixed speed pattern when the stop assured relay VS is energized. The crosshead travels at equivalent car speed from the pick up of relay VS to the drop of relay AU or AD to define the interval the car seeks to run at constant speed.

In a short run the accelerating car has relay VS energized without effect upon the rheostat brake or advance clutch since contact VS at 200 is in series with contacts AD or AU at 199 and 200 and back contact VS at 202 is in parallel with back contacts AD and AU at 203. Relay AMS is not deenergized until both relay VS and one of relays AU or AD are energized to open contacts at 208 and 209. Thus with relay AMS energized the rheostat brake is set and the advance clutch released when relay AU or AD picks up with VS picked up for the shorter runs.

A long run in which the car approaches but fails to attain full speed prior to the pickup of a stop signal controls the advance clutch and rheostat brake through operation of relay AMS. At these higher speeds the rheostat cam shaft 16' is rotated sufficiently to open cam actuated switch RH17 at 208 and insufficiently to open switch RH18. Under these conditions, when relay V5 is energized and energizes its auxiliary VS1, back contact VS1 at 207 is opened to drop relay AMS while relay AMR remains energized through contacts AU, AD and AMR at 209. This closes back contact AMS at 201 and opens contact AMS at 203 while contact AMR at 201 remains closed to energize rheostat brake 94 and deenergize advance clutch 92. The crosshead brake is set and the rheostat brake released when relay AU or AD is deenergized following its energization. Energization of relay AU or AD deenergizes relay AMR closing back contact AMR at 197 and opening contact AMR at 201. Deenergization of relay AU or AD opens contact AD or AU at 199 and 200 and closes back contact AD or AU at 197 to energize crosshead brake 93.

Once the crosshead position is accurately established the rheostat cam shaft is driven, through the differential by continued motion of the elevator on one input, shaft 25', while the other input shaft 21' is locked, toward its neutral position. This reduces the pattern signal by releasing contacts RH18 to RH6 in their inverse numerical order. After the opening of RH6 the car will carry the inductor switches into the range of influence of the hatchway vanes 44' and 47' for the landing at which the final stop is to be made whereby the car is controlled in final portion of travel by its motion with respect to the vanes.

Rheostat direction control relay RDC at 206 provides protection for the floor selector machine in the event there is a malfunction, as in the circuits controlling one or more of the crosshead brake, rheostat brake, or advance clutch, whereby the rheostat cam shaft 16' rotates in a direction opposite that in which the car is set to run. This reverse rotation can be produced by the differential and will upset the speed control sequences for the generator shunt field. Such a malfunction is sensed by cam controlled contacts RH$d$ and RH$a$ at 205 and 207 which are set to be closed when the rheostat cam shaft 16' has rotated a substantial amount (e.g., 30° or about one quarter of the rotation to the full speed position) in the down and up directions respectively. Thus a car set to ascend has up generator field relay contact UF at 205 closed so that rotation of shaft 16' in the direction to set up the descending acceleration pattern will close contact RH$d$ completing a circuit to relay RDC. Similarly a descending car having contact DF at 207 closed will energize relay RDC if its shaft 16' rotates in the up direction to close contact RH$u$.

Energization of rheostat direction control relay RDC closes a seal circuit through contact RDC at 206 if the landing and gate relay contact LG at 206 is closed indicating that the car is set to run. When a rheostat reversal malfunction occurs, the car is switched to a low speed operation and the advance motor 37' is utilized to drive the crosshead 38' and, through the differential 20', the rheostat cam shaft 16' to their proper control positions until the car reaches the next landing. Back contacts RDC at 191 and 200 open to deenergize the crosshead brake 93, rheostat brake 94 and advance clutch 92. Car motion therefore supplies an input to the differential at a speed equivalent to the ratio of one to one car speed to relative crosshead speed. The crosshead is driven by the advance motor through closure of contact RDC at 225.

Under the above conditions, the rheostat cam shaft is rotated only a limited degree and the speed pattern will call for low speed operation. This is accomplished by the operation of the advance motor to move the crosshead 38' in step with the car and, through the differential, return shaft 16' to its neutral position through control of rheostat switches RH3 and RH4 as described below.

As the car moves into the final leveling region of the next landing, as when leveling relay LU8 or LD8 is dropped to close its back contact at 180, leveling door open relay LDO at 180 is energized and the door and gate begin to open. This deenergizes landing and gate relay LG by opening switches L and G at 165 thereby deenergizing relay RDC by opening contact LG at 206. When relay RDC drops to close its contacts RDC at 191 and 200 and open its contact at 225 normal stopping operations for the car are restored. Car motion to the landing as controlled by the leveling switches and the brake carries the crosshead 38' to the landing position on array 40' and sets crosshead brake 93 and the correcting motor drives the rheostat cam shaft to neutral. With the normal conditions restored the car is prepared to be started again.

FIGURE 8

Normally the final travel of the car to a position level with the landing causes the rheostat cam shaft to rotate to its neutral position. However, it is possible for that shaft to be off of its neutral position when the car stops either because of slippage of lifting cables 33' on sheave 32' or because of slippage in clutch 36'. A correcting motor 74' is provided to drive the shaft 16' to its neutral position if it is not there when the car stops.

The correcting motor has fields CF1' and CF2' which can be energized only when the protective relay contact LP at 223 is closed as it will be under safe operating conditions and the main switch back contact MS at 223 is closed indicating the car is stopped. If the rheostat cam shaft 16' is in its neutral position the cam's actuating switches RH3 and RH4 will be free of the followers for those switches and the circuit to the fields will be open by RH3 at 222 and RH4 at 224. Any deviation from neutral will close one of these switches and energize the correcting motor in a manner to cause it to drive the shaft 16' toward neutral. During this correction the crosshead brake 93 remains energized and lockup is avoided since the drive clutch 36' is deenergized by open main switch contact MS at 204, open protective relay contact LP at 203 and open dead zone contact DZ at 202.

Advance motor 37' is employed to drive the crosshead for inspection operation, to correct crosshead position on an emergency stop and for a floor selector machine malfunction of the type discussed above wherein the rheostat cam shaft is rotated in the wrong direction. In the event of an emergency stop relay LP at 184 is dropped by open emergency relay contact EM at 179 to close back contact LP at 227 and enable energization of the advance motor. When the car is operated on inspection by opening one of the inspection switches 97 at 221 to deenergize inspection relay IN, relay LP is also deenergized (by means not shown) to enable the advance motor. A reversal of the rheostat cam shaft rotation with respect to its neutral position from the direction of actual car motion to energize relay RDC will close contact RDC at 224 and enable the advance motor. Under any of the above circumstances the advance motor is energized only when shaft 16' departs from its neutral position to close one of contacts RH3 at 225 or RH4 at 227 and only so long as the shaft remains off its neutral position. Thus when the car is running as on inspection, or for a stop between the floors where back contact SBF at 221 is open to effectively hold the car on inspection to the next landing, or a rheostat reversal, the advance motor will be intermittently energized so that the crosshead and through the differential the rheostat cam shaft will be driven intermittently until the condition is corrected.

The system of FIG. 2 responds to a stop at other than a landing in the manner of FIG. 1 by operating a stop between floors relay SBF. As shown in FIG. 6, SBF pulls in when contact L4 at 179 is closed by the restoration of the safety switches and the energization of emergency relay EM to close contact EM at 135 of FIG. 4. Back contact SBF at 221 is opened to drop inspection relay IN and cause the car to operate as on inspection in running to the next landing at low speed. As previously described relay SBF when energized operates car start relay CS at 186, drops protection relay LP at 185, and prevents any change in speed pattern from rheostat 51. It is deenergized when leveling switch L4 is deenergized to open contact L4 at 179 as the car reaches a point four inches from the landing.

When running in the inspection condition either by virtue of an inspection operation or a stop between floors, the rheostat brake 94 is set, the crosshead brake 93 is released, the advance clutch 92 is released and the drive clutch 36′ is engaged so that the differential receives inputs from the advance motor 37′ and the hoist motor 30′. The drop of relay LP opens contact LP at 191 to release the crosshead brake 93, and closes back contact LP at 227 to energize the advance motor. The drop of relay IN closes back contact IN at 198 to energize the rheostat brake 94. Relay AMS is dropped by open contact LP at 208 to open contact AMS at 203 and prevent energization of advance clutch 92.

The system of FIG. 2 corresponds to FIG. 1 in that a car starts away from a landing, even when it has moved out of the dead zone and is required to travel through the dead zone to the next landing, without any decrease in the generator shunt field current as it passes through the dead zone, since relay DZ is controlled in the system of FIG. 2 in the same manner as in the system of FIG. 1 so that it cannot be pulled in once it has dropped during a starting operation. This maintains the first increase in the pattern at back contact DZ at line 123 once it occurs.

In the system of FIG. 2 contact VS at 123 can be eliminated if the acceleration string of resistance is shunted by additional inductor switch controlled contacts such as by substituting parallel contacts of LD8 and LU8 for the step provided by contact RH5 and L15 for the step provided by contact RH6. Under these circumstances the transition from the acceleration to the deceleration resistance string in the shunt field control can be accomplished without discontinuities.

The two examples set forth above are merely illustrative of a car position controlled elevator hoist motor. The inventive features set forth can be applied to other systems without departing from the spirit and scope of this invention. Accordingly these disclosures are not to be read in a limiting sense.

We claim:
1. In a control for an elevator car including a hoist motor, means for controlling the speed of said hoist motor, car leveling means for precisely ascertaining the spacing of said car from a position level with a floor at at least two positions when said car is within a predetermined distance of said floor and means altering said speed control means in response to the spacing of said car from said floor as sensed by said car leveling means as a car approaches a floor for reducing the speed of said hoist motor, the improvement which comprises, means for starting a car, means maintaining said car leveling means effective during the start of a car by said starting means for travel away from a floor, and means altering said speed control means to provide at least two levels of speed setting in response to the spacing of said car from said floor at said two positions as sensed by said leveling means as said car departs from said floor for increasing the speed of said hoist motor as the spacing from said floor increases.

2. A control according to claim 1 including means for sensing the presence of a car stopped at a position spaced from a landing outside of the range of effectiveness of said car leveling means, means responsive to the sensing of a stopped car out of the range of said leveling means to limit the operation of said hoist motor to a speed of the order of inspection speed and means responsive to said sensing means to stop said car operating in response to said speed limiting means at the next landing it encounters.

3. A control according to claim 1 including means for sensing the presence of a car stopped at a position spaced from a landing outside of the range of effectiveness of said car leveling means, and means responsive to the sensing of a stopped car out of the range of said leveling means to limit the operation of said hoist motor to a speed of the order of inspection speed.

4. An elevator control for a car driven along a hatchway to serve a plurality of landings by a hoist motor comprising an indexing means in said hatchway adjacent each landing, a plurality of switch means mounted in spaced relation on said car and arranged to be actuated by said indexing means over a given range of positions with respect to said indexing means, a shaft rotated by said hoist motor in accordance with the amount said hoist motor has driven said car from its last stop, said shaft being rotated in a first direction for a first direction of car travel and a second direction for a second direction of car travel, means for starting said car selectively in said first and second directions of travel from a landing at which it is stopped, means for increasing the speed of the hoist motor for a starting car in accordance with the operation of said switch means adjacent the landing from which said car is started, means for increasing the speed of said hoist motor in accordance with the amount of rotation of said shaft after a given rotation of said shaft and a given displacement of said switch means with respect to said indexing means, and safety means responsive to rotation of said shaft in a direction for car travel in one of said directions when said car is started to travel in the other of said directions for limiting the operation of said hoist motor to a speed of the order of inspection speed.

5. A combination according to claim 4 including means responsive to said safety means for stopping said car at the next landing it encounters along said hatchway.

References Cited
UNITED STATES PATENTS

| | | | |
|---|---|---|---|
| 2,657,765 | 11/1953 | Savage | 187—29 |
| 2,674,348 | 4/1954 | Santini et al. | 187—29 |
| 2,699,226 | 1/1955 | Bruns | 187—29 |
| 2,847,091 | 7/1958 | Santini et al. | 187—29 |
| 3,146,857 | 9/1964 | Bosshard | 187—29 |

ORIS L. RADER, *Primary Examiner.*

THOMAS LYNCH, *Assitant Examiner.*